(12) United States Patent
Shirai et al.

(10) Patent No.: US 11,270,133 B2
(45) Date of Patent: Mar. 8, 2022

(54) OBJECT DETECTION DEVICE, OBJECT DETECTION METHOD, AND COMPUTER-READABLE RECORDING MEDIUM

(71) Applicant: DENSO CORPORATION, Kariya (JP)

(72) Inventors: Hideki Shirai, Tokyo (JP); Masayuki Imanishi, Nisshin (JP); Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 16/682,367

(22) Filed: Nov. 13, 2019

(65) Prior Publication Data
US 2020/0082184 A1 Mar. 12, 2020

Related U.S. Application Data

(63) Continuation of application No. PCT/JP2018/016798, filed on Apr. 25, 2018.

(30) Foreign Application Priority Data

May 17, 2017 (JP) .............................. JP2017-098017

(51) Int. Cl.
*G06K 9/00* (2006.01)
*G06T 7/20* (2017.01)

(52) U.S. Cl.
CPC ...... *G06K 9/00805* (2013.01); *G06K 9/00711* (2013.01); *G06T 7/20* (2013.01);
(Continued)

(58) Field of Classification Search
CPC ........... G06K 9/00711; G06K 9/00805; G06K 9/4604; G06T 7/13; G06T 7/20;
(Continued)

(56) References Cited

U.S. PATENT DOCUMENTS 9,892,328 B2 * 2/2018 Stein ........................ G06T 7/248
2009/0189783 A1 7/2009 Koitabashi
(Continued)

FOREIGN PATENT DOCUMENTS

EP 3009789 A1 4/2016
JP 2009-180536 A 8/2009
(Continued)

OTHER PUBLICATIONS

Liebe, Bastian et al., "Dynamic 3d Scene Analysis from a Moving Vehicle", IEEE Conference on Computer Vision and Pattern Recognition (CVPR'07), 2007.

*Primary Examiner* — Katrina R Fujita
(74) *Attorney, Agent, or Firm* — Maschoff Brennan

(57) ABSTRACT

An object detection device acquires a plurality of images captured by a camera mounted in a moving body and acquires movement information of the camera. The object detection device extracts an edge from a first image among the acquired images. The object detection device calculates a plurality of candidate points corresponding to the edge in a second image, based on the movement information and calculates candidate points corresponding to a plurality of heights as height candidates of the edge. The object detection device calculates a correlation index value between the edge and each of the plurality of candidate points and detects the candidate point with the largest correlation as a correspondence point of the edge. The object detection device detects an object at a position of the edge when the correlation index value of the detected correspondence point is equal to or smaller than a predetermined threshold.

12 Claims, 11 Drawing Sheets

(52) U.S. Cl.
CPC ........... *G06T 2207/10016* (2013.01); *G06T 2207/30196* (2013.01); *G06T 2207/30232* (2013.01)

(58) Field of Classification Search
CPC .......... G06T 7/246; G06T 2207/10016; G06T 2207/30196; G06T 2207/30232; G06T 2207/30252; G08G 1/16; G01B 11/00
See application file for complete search history.

(56) References Cited

U.S. PATENT DOCUMENTS

| | | | | |
|---|---|---|---|---|
| 2011/0255741 | A1* | 10/2011 | Jung | G06K 9/00369 382/103 |
| 2013/0100281 | A1* | 4/2013 | Sharma | G06K 9/6203 348/135 |
| 2013/0103299 | A1* | 4/2013 | Matsuda | G06K 9/00805 701/300 |
| 2015/0210312 | A1* | 7/2015 | Stein | G06K 9/00805 701/41 |
| 2017/0091565 | A1* | 3/2017 | Yokoi | G06K 9/00798 |
| 2019/0026568 | A1* | 1/2019 | Kario | G06K 9/00798 |

FOREIGN PATENT DOCUMENTS

| | | |
|---|---|---|
| JP | 2013-120133 A | 6/2013 |
| JP | 2016-148512 A | 8/2016 |

* cited by examiner

IN-VEHICLE DEVICE INFORMATION (CAN INFORMATION)

FIG.4
IMAGE AT TIME $t_0$
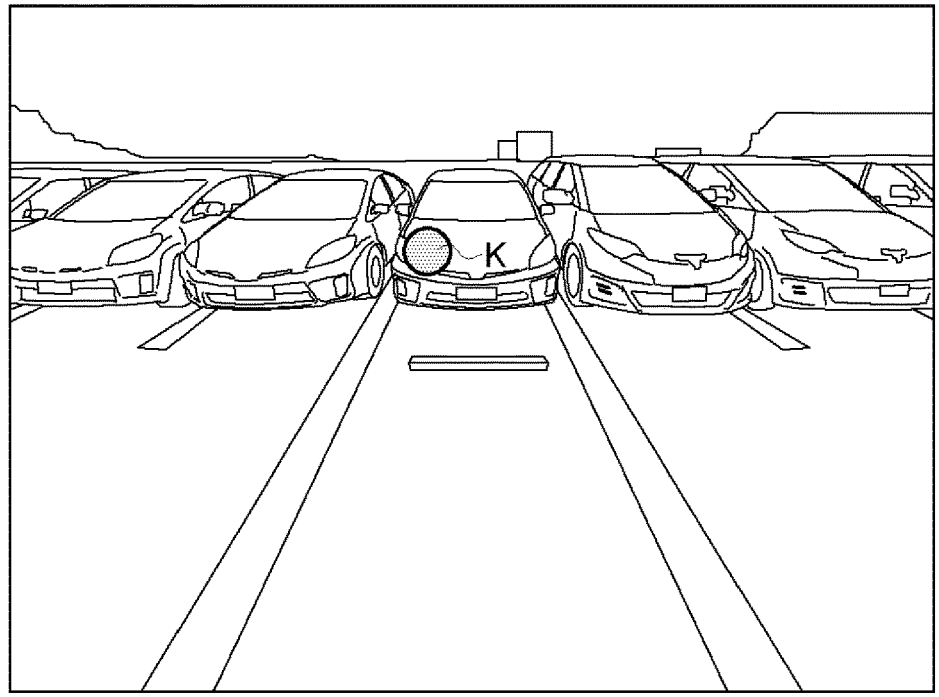
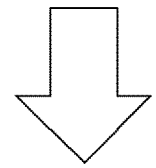
MOVEMENT OF OWN VEHICLE
IMAGE AT TIME $t_1$
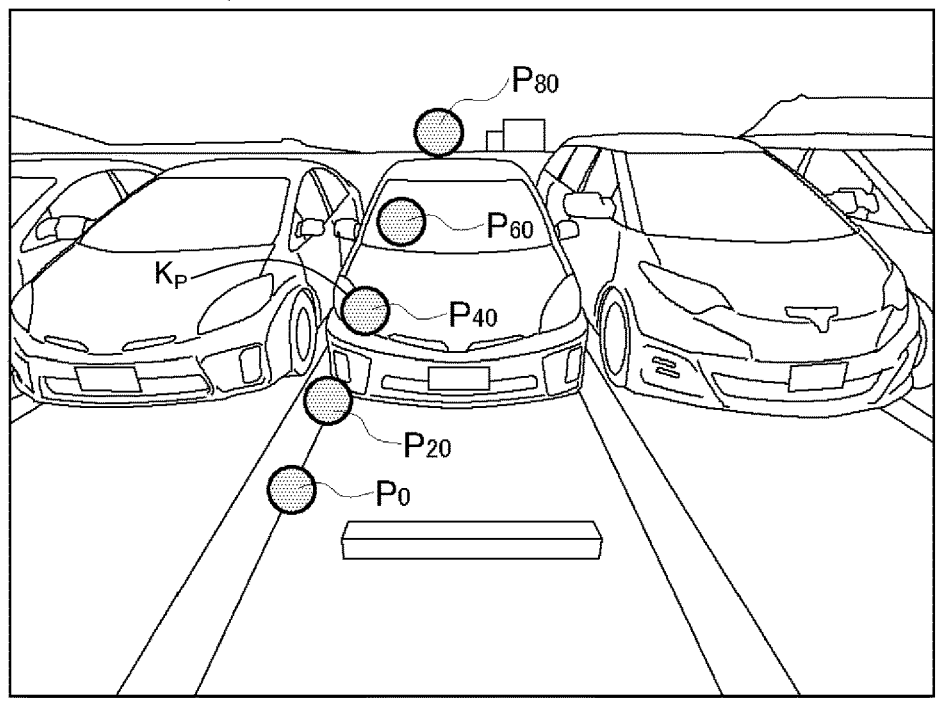

FIG.6
IMAGE AT TIME $t_0$
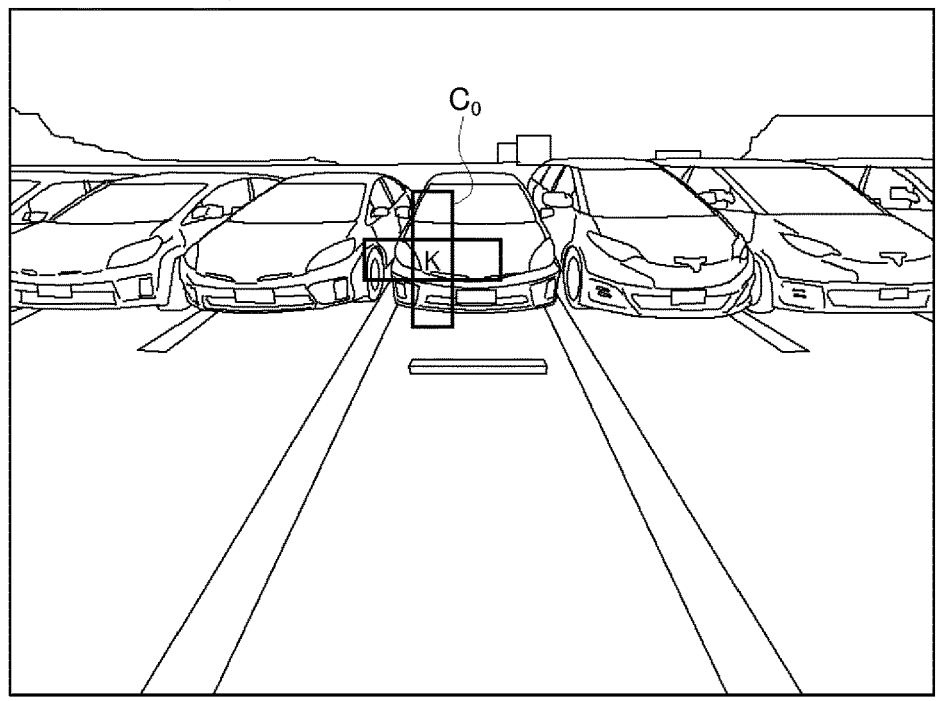
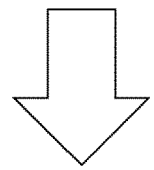
MOVEMENT OF OWN VEHICLE
IMAGE AT TIME $t_1$
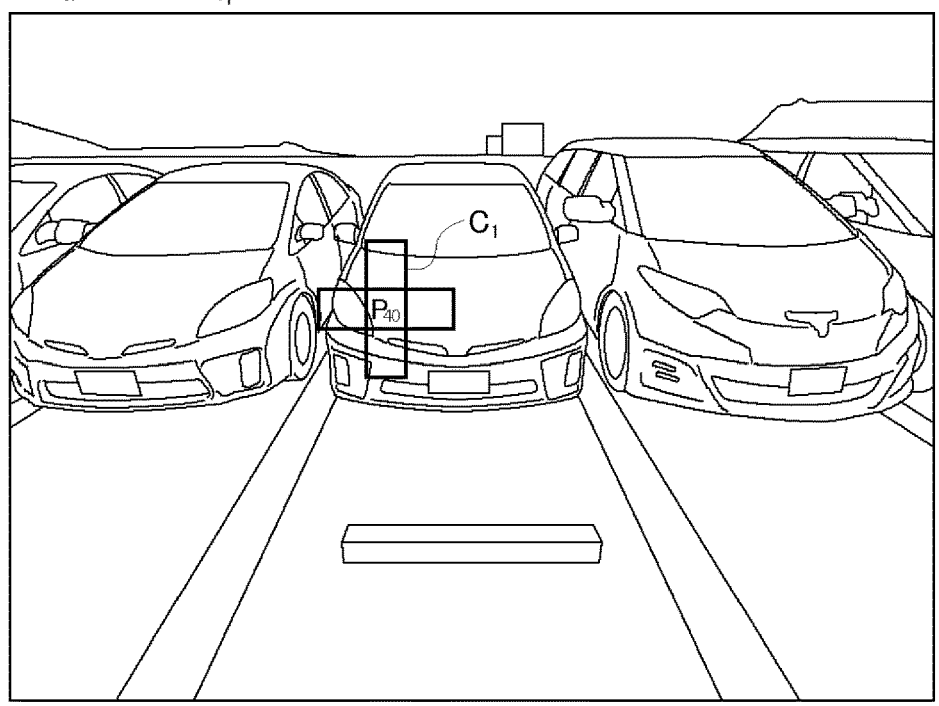

OBJECT DETECTION DEVICE, OBJECT DETECTION METHOD, AND COMPUTER-READABLE RECORDING MEDIUM

CROSS-REFERENCE TO RELATED APPLICATION

The present application is a continuation application of International Application No. PCT/JP2018/016798, filed Apr. 25, 2018, which claims priority to Japanese Patent Application No. 2017-098017, filed May 17, 2017. The contents of these applications are incorporated herein by reference in their entirety.

BACKGROUND

1. Technical Field

The present invention relates to a technique for detecting an object.

2. Related Art

There has been known a technique for detecting an object based on time-series images captured by a camera mounted in a vehicle.

SUMMARY

The present disclosure provides an object detection device. An object detection device as an aspect of the present disclosure includes an image input unit, a movement information acquisition unit, a feature point extraction unit, a candidate point calculation unit, a correspondence point detection unit, and an object detection unit. The feature point extraction unit extracts a feature point from a first image acquired by the image input unit. Based on the movement information acquired by the movement information acquisition unit, the candidate point calculation unit calculates a plurality of candidate points corresponding to the feature point in a second image captured at a time different from the first image. At this time, the candidate point calculation unit calculates the plurality of candidate points corresponding to a plurality of heights set as height candidates of the feature point, in accordance with the heights. The correspondence point detection unit calculates a magnitude of correlation between the feature point and each of the plurality of candidate points, and detects from the candidate points a correspondence point corresponding to the feature point based on the magnitude of the correlation. When a height of the correspondence point is larger than a predetermined value, the object detection unit detects an object at a position of the feature point.

BRIEF DESCRIPTION OF THE DRAWINGS

In the accompanying drawings:

FIG. 4 is a diagram illustrating a process of detecting correspondence points in an image at time $t_1$ corresponding to an edge in an image at time $t_0$;

FIG. 6 is a diagram illustrating a predetermined area including an edge and a predetermined area including a candidate point;

DETAILED DESCRIPTION OF THE PREFERRED EMBODIMENTS

Figure 1A:
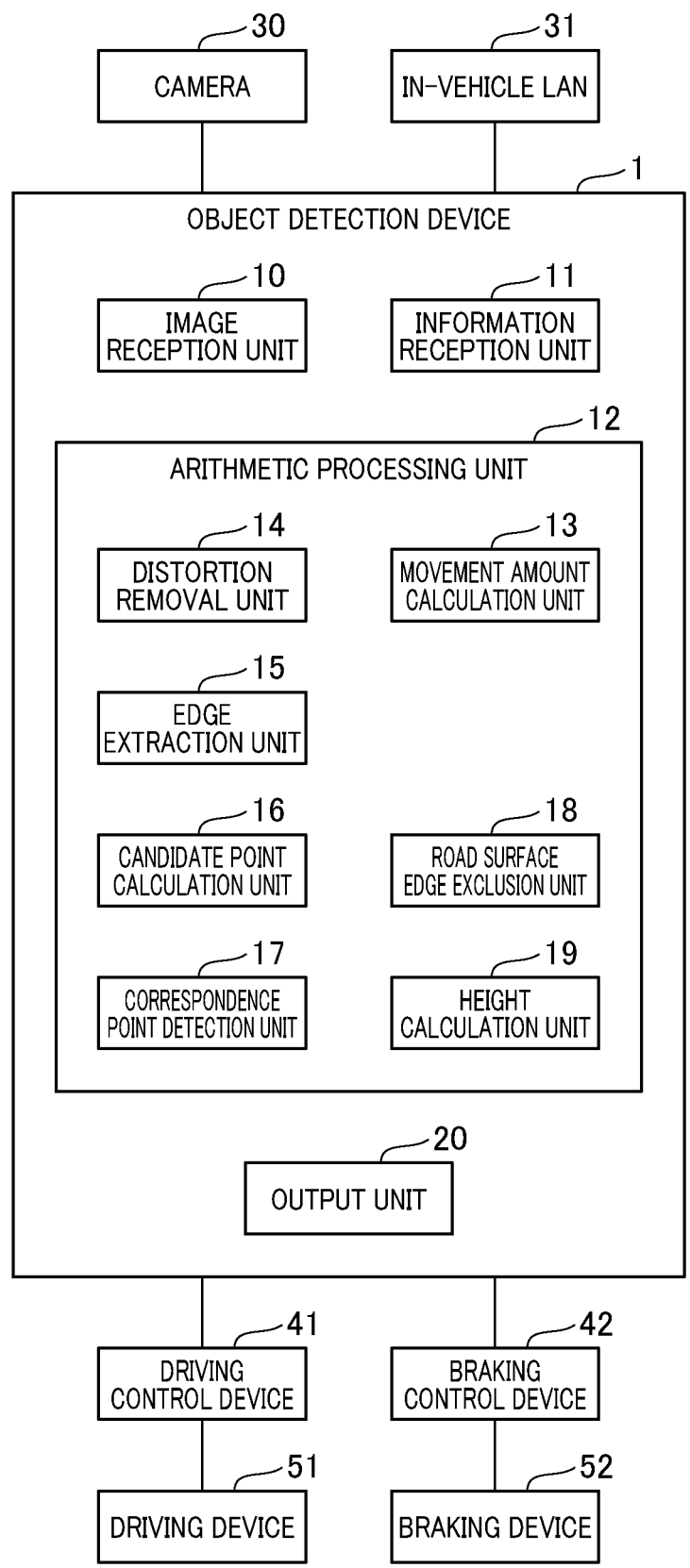
FIG. 1A is a diagram illustrating a configuration of an object detection device in an embodiment of the present disclosure.

When image capturing from a vehicle in motion is performed at different times, images can be obtained from different perspectives. For example, as shown in the following NPL1, there has been conventionally known a technique for detecting an object based on time-series images captured by a camera mounted in a vehicle. An example of this technique is object detection using Structure from Motion (SfM).

[NPL 1]: A. Thomas, V. Ferrari, B. Leibe, T. Tuytelaars, and L. VanGool., "Dynamic 3d scene analysis from a moving vehicle", IEEE Conference on Computer Vision and Pattern Recognition (CVPR '07), 2007.

The object detection using SfM causes a large load of arithmetic processing. The present disclosure is to provide an object detection technique that reduces a load of arithmetic processing.

An object detection device as an aspect of the present disclosure includes an image input unit, a movement information acquisition unit, a feature point extraction unit, a candidate point calculation unit, a correspondence point detection unit, and an object detection unit. The image input unit acquires images captured by a camera mounted in a moving body. The movement information acquisition unit acquires movement information of the moving body based on information received from a device mounted in the moving body. The feature point extraction unit extracts a feature point from a first image acquired by the image input unit. Based on the movement information, the candidate point calculation unit calculates a plurality of candidate points corresponding to the feature point in a second image captured at a time different from the first image. At this time, the candidate point calculation unit calculates the plurality of candidate points corresponding to a plurality of heights set as height candidates of the feature point, in accordance with the heights. The correspondence point detection unit calculates a magnitude of correlation between the feature point and each of the plurality of candidate points, and detects from the candidate points a correspondence point corresponding to the feature point based on the magnitude of the correlation. When a height of the correspondence point is larger than a predetermined value, the object detection unit detects an object at a position of the feature point.

According to this configuration, the object detection device as an aspect of the present disclosure calculates the plurality of candidate points corresponding to the plurality of heights set as the height candidates of the feature points in accordance with the plurality of heights, based on the movement information of the moving body. Therefore, the object detection device can detect from the candidate points the correspondence point corresponding to the feature point. As a result, the object detection device can reduce a load of arithmetic processing relating to object detection.

In the object detection device as an aspect of the present disclosure, the correspondence point detection unit may detect from among the plurality of candidate points, the candidate point with maximum correlation as the correspondence point. According to this configuration, the object detection device as an aspect of the present disclosure can properly detect the correspondence point corresponding to the feature point.

The object detection device as an aspect of the present disclosure may include a height calculation unit. The height calculation unit calculates a height of the correspondence point as a height of an object. According to this configuration, the object detection device as an aspect of the present disclosure can easily calculate the height of the object with the information having been used for performing object detection.

In the object detection device as an aspect of the present disclosure, the candidate point calculation unit may calculate the plurality of candidate points while changing the height of the feature point and the number of the height candidates depending on a mode of movement of the moving body or a surrounding environment of the moving body. In this manner, the object detection device as an aspect of the present disclosure sets properly the heights of the candidate points based on the mode of movement of the moving body or the surrounding environment of the moving body. According to this configuration, the object detection device can properly detect the correspondence point corresponding to the feature point.

In the object detection device as an aspect of the present disclosure, the feature point extraction unit may scan the first image to search for the feature point, and when detecting the feature point, the feature point extraction unit may omit a search of a predetermined pixel range including the detected feature point. In this manner, when the feature point is detected, the object detection device as an aspect of the present disclosure excludes a periphery of the feature point from a search range. According to this configuration, the object detection device can reduce a load of arithmetic processing in searching for the feature point.

In the object detection device as an aspect of the present disclosure, the feature point extraction unit may make a determination on the feature point every other pixel. In this manner, the object detection device as an aspect of the present disclosure performs the determination on every other pixel. According to this configuration, the object detection device can prevent an omission of detection of the feature point. Further, the object detection device can reduce a load of arithmetic processing relating to object detection while preventing an omission of detection.

In the object detection device as an aspect of the present disclosure, the candidate point calculation unit may calculate the candidate point assuming that the height of the feature point is zero, and when the magnitude of correlation between the feature point and the candidate point is equal to or greater than a predetermined magnitude, the candidate point calculation unit may exclude the feature point from a target of object detection processing. In this manner, in the object detection device as an aspect of the present disclosure, when the magnitude of the correlation between the candidate point with the height of zero and the feature point is equal to or greater than the predetermined magnitude, there is a high probability that the feature point is a feature point on a road surface. It is consequently considered that there exists no object at the position of the feature point. Thus, the object detection device excludes the point regarded as the feature point on the road surface among the feature points from being a target of object detection processing. Accordingly, the object detection device can reduce a load of arithmetic processing relating to object detection.

The object detection device as an aspect of the present disclosure may include a road surface feature point detection unit. The road surface feature point detection unit calculates the candidate point assuming that the height of the feature point is zero. When the magnitude of the correlation between the feature point and the candidate point is equal to or greater than a predetermined magnitude, the road surface feature point detection unit may detect the feature point as a feature point on the road surface. According to this configuration, the object detection device can efficiently detect an edge of the road surface.

In the object detection device as an aspect of the present disclosure, the image input unit acquires the first image captured along with movement of the moving body and the plurality of second images captured following the first image. When the initial second image is acquired following the first image, the correspondence point detection unit calculates a magnitude of correlation between a feature point in the first image and each of a plurality of candidate points in the second image and stores the calculated magnitude of the correlation in a predetermined storage area. When the new second image is acquired, the correspondence point detection unit calculates a magnitude of correlation between the feature point in the first image and each of a plurality of candidate points in the new second image. Based on the calculated magnitude of the correlation and the stored magnitude of the correlation, the correspondence point detection unit calculates a new magnitude of correlation, and stores the calculated new magnitude of the correlation in a predetermined storage area. The correspondence point detection unit may repeat this process along with the reception of the new second image. In this manner, the object detection device as an aspect of the present disclosure successively updates the magnitude of the correlation between the feature point in the first image and each of the plurality of candidate points in the second image. According to this configuration, the object detection device can delete the second image after the calculation and storage of the new magnitude of the correlation. Accordingly, the object detection device can reduce a storage capacity required for use in arithmetic processing relating to object detection.

An object detection method as an aspect of the present disclosure is a method used by an object detection device to detect an object. The object detection method includes the following steps of: by the object detection device, acquiring images captured by a camera mounted in a moving body; by the object detection device, acquiring movement information of the moving body based on information received from a device mounted in the moving body; by the object detection device, extracting a feature point from a first image acquired from the camera; and, by the object detection device, calculating a plurality of candidate points corresponding to the feature point in a second image captured at a time different from the first image, based on the movement information. At this time, in accordance with a plurality of heights set as height candidates of the feature point, the object detection device calculates the plurality of candidate points corresponding to the heights. The object detection device calculates a magnitude of correlation between the feature point and each of the plurality of candidate points, and detects from the candidate points a correspondence point corresponding to the feature point based on the magnitude of the correlation. When a height of the correspondence point is greater than a predetermined threshold, the object detection device detects an object at the position of the feature point.

A recording medium as an aspect of the present disclosure is a recording medium storing a program for causing a computer to execute the object detection method for detecting an object based on images captured by a camera mounted in a moving body and movement information of the moving body.

As described above, according to the technique of the present disclosure, it is possible to reduce a load of arithmetic processing for detecting an object from images.

Hereinafter, embodiments of an object detection device and an object detection method as an aspect of the present disclosure will be described with reference to the drawings.

FIG. 1A is a diagram illustrating a configuration of an object detection device 1 in the present embodiment. The object detection device 1 is a device used in a state of being mounted in a vehicle. The object detection device 1 is connected to a camera 30 and an in-vehicle LAN 31 (CAN) installed in the vehicle. The object detection device 1 stores information relating to settings of the camera 30 such as a height from the ground to the camera 30 and the orientation of the camera 30. The object detection device 1 receives information on in-vehicle devices 40 (hereinafter, called "in-vehicle device information") via the in-vehicle LAN 31. The in-vehicle devices 40 are various ECUs mounted in the vehicle, for example. The in-vehicle device information is CAN information obtained from the in-vehicle devices 40. The in-vehicle device information relating to movement of the vehicle refers to a steering angle (tire lateral turn angle) and an average value of a wheel driving amount, for example.

Figure 1B:
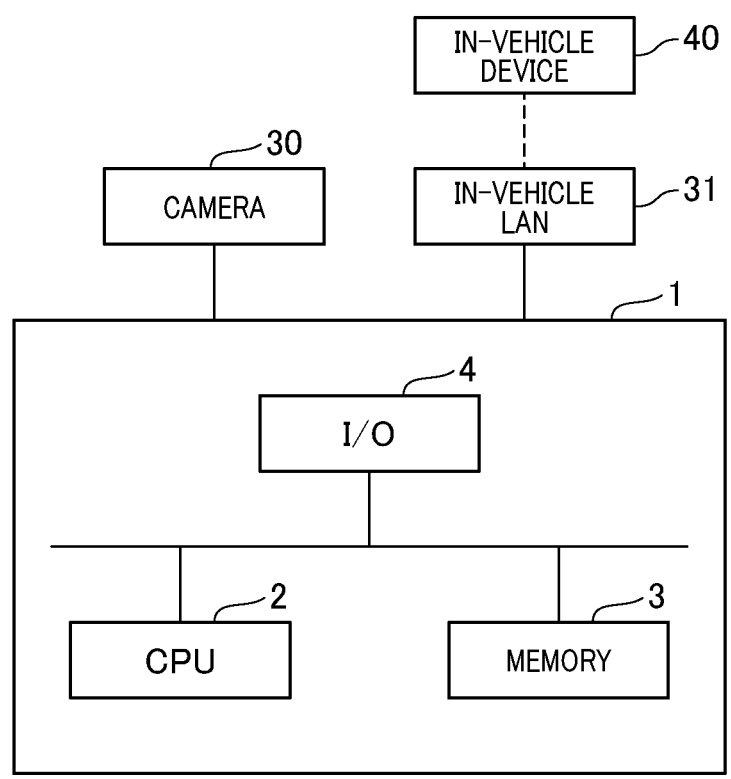
FIG. 1B is a diagram illustrating a hardware configuration of the object detection device in the embodiment of the present disclosure.

The object detection device 1 has a function of detecting a still object based on time-series images (images in a plurality of frames) captured by the camera 30. The object detection device 1 has an image reception unit 10, an information reception unit 11, an arithmetic processing unit 12, and an output unit 20. The image reception unit 10 receives images from the camera 30. The information reception unit 11 receives the in-vehicle device information via the in-vehicle LAN 31. The arithmetic processing unit 12 performs an arithmetic operation of object detection. That is, the arithmetic processing unit 12 serves as an object detection unit to detect objects. The output unit 20 outputs a result of object detection. The output of the detection result is used in a process as described below, for example. The object detection device 1 is connected to a driving control device 41 and a braking control device 42 included in the in-vehicle devices 40 via the in-vehicle LAN 31. The driving control device 41 controls operations of a driving device 51 including an engine mounted in the vehicle, for example. The braking control device 42 controls operations of a braking device 52 such as a brake mounted in the vehicle, for example. The object detection device 1 generates control signals to the driving device 51 and the braking device 52 based on the result of object detection. The object detection device 1 transmits the generated control signals to the driving control device 41 and the braking control device 42. Consequently, the driving control device 41 and the braking control device 42 control the driving device 51 and the braking device 52 based on the received control signals. When the object detection device 1 is mounted in a vehicle, for example, the foregoing control signals are generated to prevent the vehicle from contacting an object. Specifically, the object detection device 1 calculates a distance between the detected object and the vehicle based on the result of object detection. When the calculated distance becomes equal to or shorter than a predetermined distance, the object detection device 1 generates a control signal for stopping the vehicle and transmits the same to the driving control device 41 and the braking control device 42. Based on the received control signal, the driving control device 41 and the braking control device 42 control the driving device 51 and the braking device 52 to stop the vehicle. The object detection device 1 is formed from an electronic control unit (ECU) hardware-wise as illustrated in FIG. 1B, for example. The electronic control unit mainly includes a CPU 2, a memory 3, and an I/O 4. The memory 3 is a semiconductor memory such as a ROM, a RAM, or a flash memory, for example. The CPU 2 executes programs stored in a non-transitory tangible recording medium. The programs are defined by processes for implementing functions. Accordingly, the functions of the object detection device 1 are implemented by the CPU 2 executing the programs. In the present embodiment, the memory 3 is equivalent to the non-transitory tangible recording medium. Among recording media, the non-transitory tangible recording medium refers to a recording medium excluding electromagnetic waves. The number of electronic control units forming the object detection device 1 may be one or more. As described above, the present disclosure includes the programs for controlling the ECU to implement the functions and operations described below. The method for implementing the functions of the object detection device 1 is not limited to software. Alternatively, some or all of the functions may be implemented by hardware with a combination of a logical circuit, an analog circuit, and others, for example.

The image reception unit 10 receives the captured images from the camera 30. That is, the image reception unit 10 serves as an image input unit that inputs the images captured by the camera 30 to the object detection device 1. The image reception unit 10 also receives information on the capturing time of each frame together with the images. The image reception unit 10 stores the received data in a predetermined storage area of the memory 3. This allows the object detection device 1 to associate the captured images with movement information described later based on the time information. Specifically, the object detection device 1 can detect how the vehicle has moved for the period of time between the capturing of a first image and the capturing of a second image among the time-series images acquired from the camera 30.

The information reception unit 11 receives information from the various in-vehicle devices 40 connected to the object detection device 1 via the in-vehicle LAN 31. The arithmetic processing unit 12 includes a movement amount calculation unit 13, a distortion removal unit 14, an edge extraction unit 15, a candidate point calculation unit 16, a correspondence point detection unit 17, a road surface edge exclusion unit 18, and a height calculation unit 19. These components will be described below.

The movement amount calculation unit 13 calculates movement information (movement amount) of the vehicle based on the in-vehicle device information received by the information reception unit 11. In other words, the information reception unit 11 calculates the movement information of the camera 30. The movement amount calculation unit 13 calculates the movement amount of the vehicle per a predetermined time based on the steering angle and the average value of wheel driving amount, for example. The movement amount calculation unit 13 serves as a movement information acquisition unit that acquires the movement information of the vehicle.

Figure 2A:
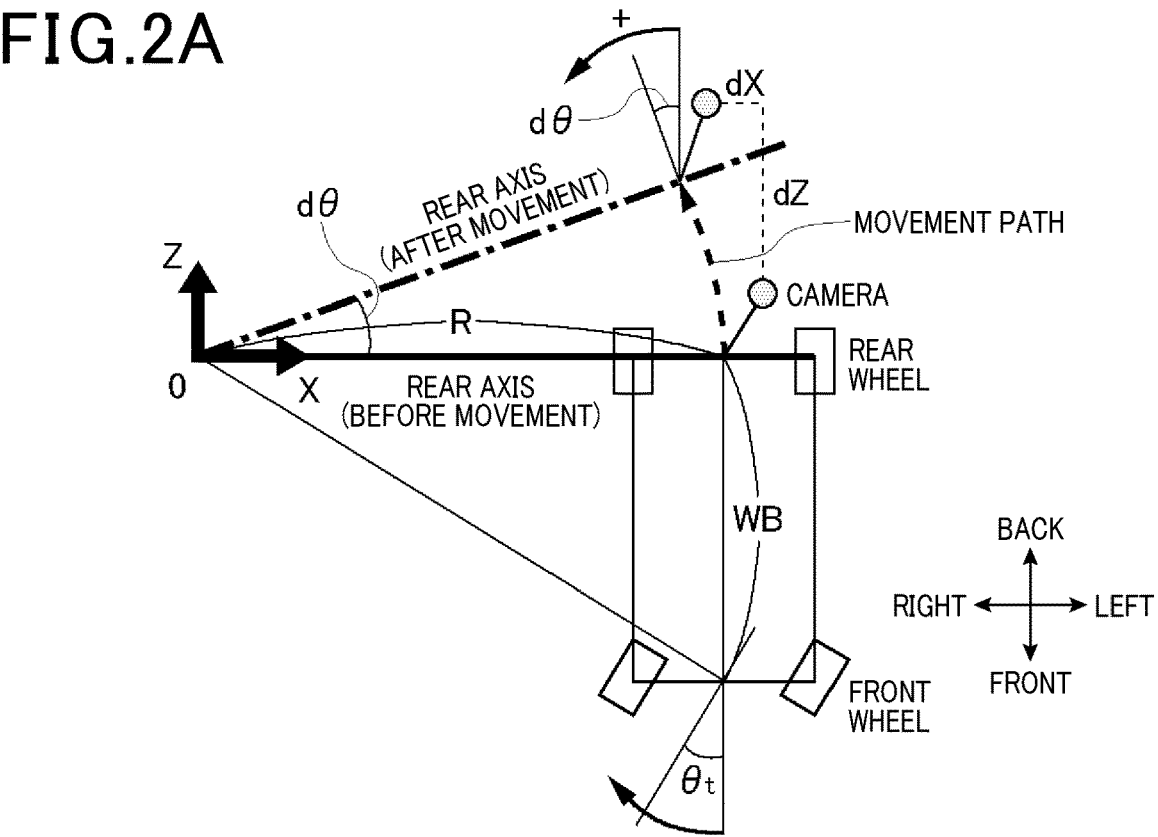
FIG. 2A is a diagram illustrating a state in which a vehicle equipped with a camera is moving and turning at the same time.
Figure 2B:
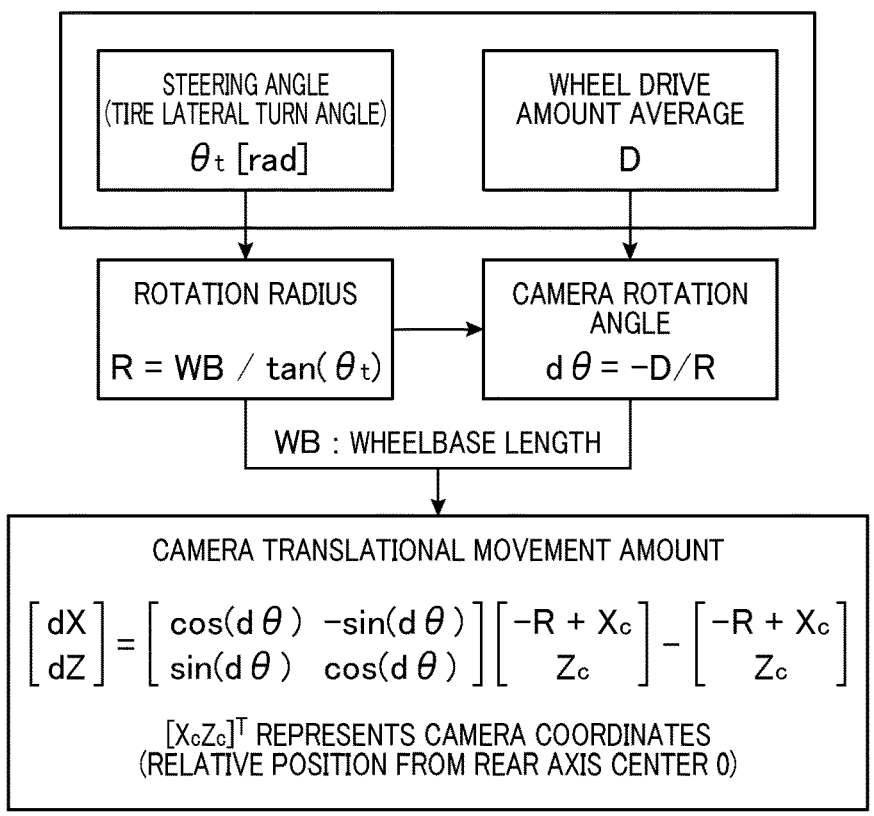
FIG. 2B is a diagram illustrating a calculation example of movement information.

FIG. 2A is a diagram illustrating a state in which the vehicle equipped with the camera 30 to capture images of an area behind the vehicle is moving back with the steering wheel turned to the right. FIG. 2B is a diagram illustrating a calculation example of the movement information at this time. In this example, the movement amount calculation unit 13 calculates the movement amount of the camera 30 based on a steering angle $\theta_t$ and an average value D of the wheel driving amount received as the in-vehicle device information. The movement amount of the camera 30 refers to translational movement amount (dX, dZ) and a camera rotation angle $d\theta$ of the camera 30 between frames.

As illustrated in FIGS. 2A and 2B, the movement amount calculation unit 13 calculates a rotation radius R from the steering angle $\theta_t$ [rad] and a wheelbase length WB of the vehicle. The movement amount calculation unit 13 calculates the rotation angle $d\theta$ of the camera 30 from the rotation radius R and the average value D of the wheel driving amount. Then, the movement amount calculation unit 13 calculates the translational movement amount (dX, dZ) of the camera 30 by an Ackerman model. The Ackerman model is one of the basic models relating to steering of a four-wheel vehicle. In this example, the rotation angle $d\theta$ and the translational movement amount (dX, dZ) of the camera 30 are calculated from the images of the area behind the vehicle captured by the camera 30. However, the present disclosure is not limited to this. Alternatively, the rotation angle $d\theta$ and the translational movement amount (dX, dZ) of the camera 30 can be calculated in the same manner as in the example described above with reference to FIGS. 2A and 2B by using images captured by the camera 30 other than a rear camera, such as a front camera or a side camera, for example.

The distortion removal unit 14 removes a distortion from the periphery of an image captured by the camera 30. In the present embodiment, the object detection device 1 stores in the memory 3 data of a table in which image coordinates in the image after distortion removal and image coordinates in the image before distortion removal are associated with each other. The distortion removal unit 14 uses the table to convert the image before distortion removal to the image after distortion removal. The method for distortion removal is not limited to the one described above but any other method may be used. Otherwise, processing may be performed without making distortion correction.

The edge extraction unit 15 extracts one or more edges from the image after distortion removal. The edge refers to a pixel portion with a change in pixel value in the image. Specifically, the edge refers to a pixel portion that corresponds to a contour (horizontal line and vertical line) or a corner point of an object in the image, for example. That is, the edge extraction unit 15 serves as a feature point extraction unit that extracts a feature point from an image.

Figure 3A:
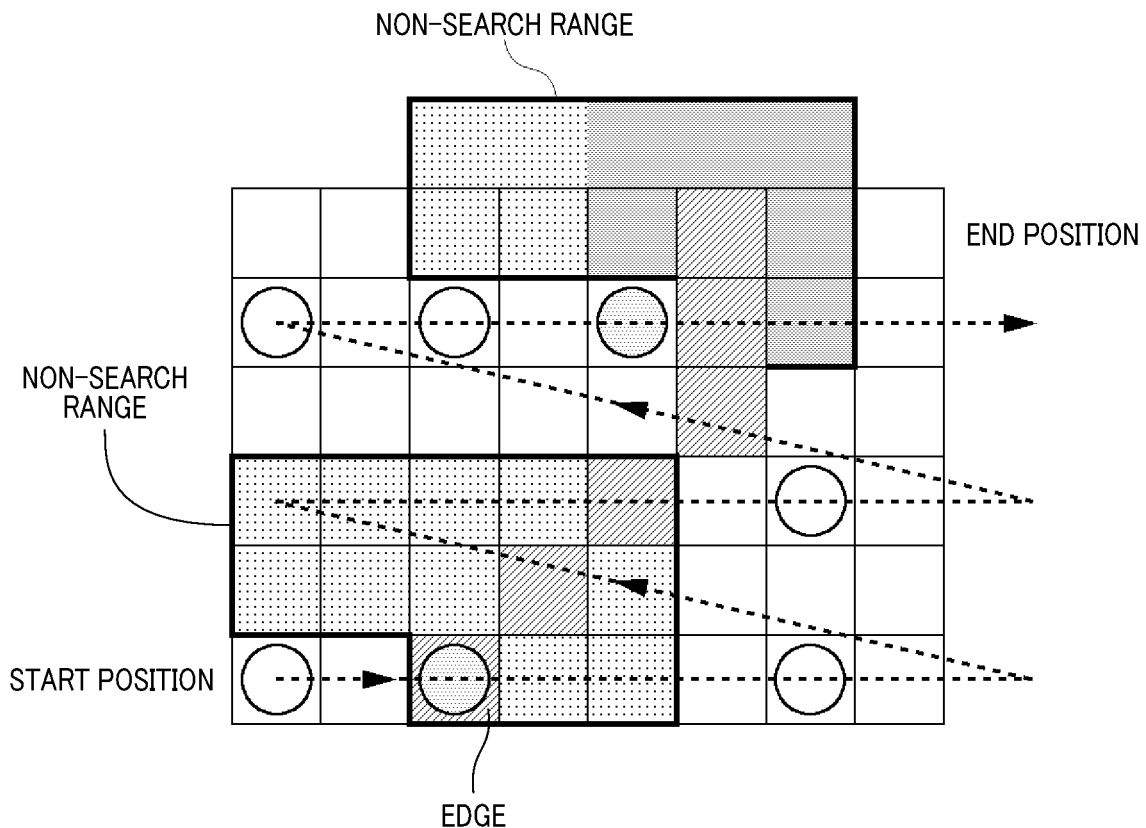
FIG. 3A is a diagram illustrating an example of scanning an image in a case where a non-search range is set.

FIG. 3A is a diagram illustrating an example of scanning an image by the edge extraction unit 15. In FIG. 3A, the hatched portions indicate edges. In the present example, among R, G, and B images, the edge extraction unit 15 accepts a reception of only an G image. The edge extraction unit 15 also uses a 3×3-pixel scanning window (search range) to perform scanning every other pixel. That is, with a skip width of two pixels in image scanning, the edge extraction unit 15 performs scanning while skipping every other pixel. Accordingly, the edge extraction unit 15 will not cause an omission of edge detection. For example, it is assumed that an array of pixels A, B, C, D, . . . is scanned every three pixels. In this case of image scanning, the pixel A is scanned and an edge between the pixel A and the pixel B is detected. After that, the pixel D separated by three pixels from the pixel A is scanned. In such image scanning, the edge between the pixel C and the pixel D can be detected, but the edge between the pixel B and the pixel C cannot be detected. That is, there occurs an omission of detection. To address this, in the present embodiment, the edge extraction unit 15 performs scanning every other pixel. Accordingly, the edge extraction unit 15 scans the pixel A and checks whether the component between the pixel A and the pixel B corresponds to an edge. Next, the edge extraction unit 15 scans the pixel C and checks whether the component between the pixel B and the pixel C and the component between the pixel C and the pixel D correspond to edges. Therefore, there occurs no omission of detection. The edge extraction unit 15 calculates the ratio of pixel values between a scanned and selected pixel and at least four pixels surrounding the selected pixel (four pixels positioned on the top, bottom, left, and right of the selected pixel). As a result, the edge extraction unit 15 extracts three edges including a corner point, a horizontal line, and a vertical line by a combination of pixels having the ratio of pixel values equal to or greater than a threshold.

When detecting an edge, the edge extraction unit 15 sets a predetermined pixel range including the pixel detected as the edge, as a non-search range, and excludes the non-search range from the target of scanning That is, the edge extraction unit 15 omits searching of the predetermined pixel range including the pixel detected as the edge. In the example illustrated in FIG. 3A, a 5×5-pixel range centered on the pixel detected as the edge is set as a non-search range. Edges existing around the detected edge are considered as edges of the same object relating to the detected edge. Accordingly, there occurs no omission of object detection even if the non-search range is set.

Figure 3B:
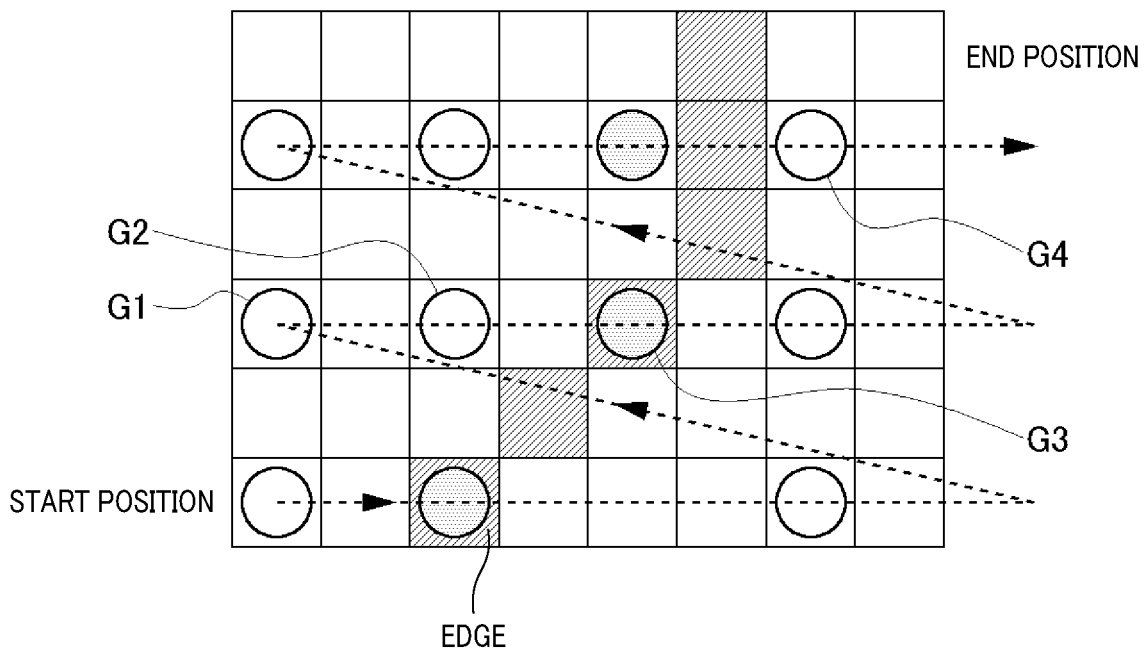
FIG. 3B is a diagram illustrating an example of scanning an image in a case where the non-search range is not set.

According to this configuration, the object detection device 1 sets the skip width of image scanning to two pixels in the edge extraction unit 15, to thereby prevent the edges of the object to be detected from being undetected. Further, the object detection device 1 can reduce the number of edges to be extracted and the amount of arithmetic operation relating to an edge extraction process by restricting the search range of image scanning by the edge extraction unit 15. FIG. 3B is a diagram illustrating an example of image scanning in the case where a non-search range is not set. In this case, it is necessary to determine whether pixels G1 to G4 included in the non-search range illustrated in FIG. 3A are edges, which increases the amount of arithmetic operation relating to the edge extraction process. In addition, the pixel G3 is detected as an edge.

The candidate point calculation unit 16 will be described. Prior to the description of the candidate point calculation unit 16, an overview of object detection will be provided. In the object detection device 1 of the present embodiment, an object is detected from images captured in a time-series manner at times $t_0, t_1, t_2, \ldots$. Specifically, the object detection device 1 associates an edge existing in an image at time $t_0$ (first image) with an edge existing in images captured at time $t_1$ and later (second images) with each other. Then, the object detection device 1 detects an object based on the association.

FIG. 4 is a diagram describing a process of detecting a correspondence point Kp in the image at time $t_1$ corresponding to an edge K in the image at time $t_0$. The object detection device 1 uses movement information (movement amount) of the camera 30 from time $t_0$ to time $t_1$ to search for the edge in the images at time $t_1$ and later corresponding to the edge in the image at time $t_0$. With a height of the edge from the road surface in addition to the movement amount of the camera 30, it is possible to specify where the edge in the image at time $t_0$ exists in the image at time $t_1$. However, only two-dimensional information can be obtained from one image and thus the height of the edge cannot be specified.

As illustrated in FIG. 4, in the present embodiment, a plurality of heights are set as height candidates of the edge K from the road surface in the image at time $t_0$ (for example, 0 cm, 20 cm, 40 cm, 60 cm, and 80 cm). When the height of the edge K is one of the preset heights, the object detection device 1 calculates to which position (coordinates) the edge K moves in the image at time $t_1$. The object detection device 1 sets the calculated positions as candidate points $P_0$, $P_{20}$, $P_{40}$, $P_{60}$, and $P_{80}$ (hereinafter, also collectively called "candidate points $P_n$") in the image at time $t_1$. Then, the object detection device 1 detects the candidate point P with maximum correlation with the edge K in the image at time $t_0$ as the correspondence point Kp corresponding to the edge K at time $t_0$. By the foregoing process, the heights of the edge K and the correspondence point Kp can be specified. When the height of the edge K is larger than a predetermined value (for example, larger than 0), the object detection device 1 determines that there exists an object at the position of the edge K and the correspondence point Kp. It is determined whether the height of the edge K is larger than a predetermined value because, if the height is equal to or smaller than the predetermined value, it can be judged that there is an edge on the road surface but there is no object on the road surface.

Figure 5:
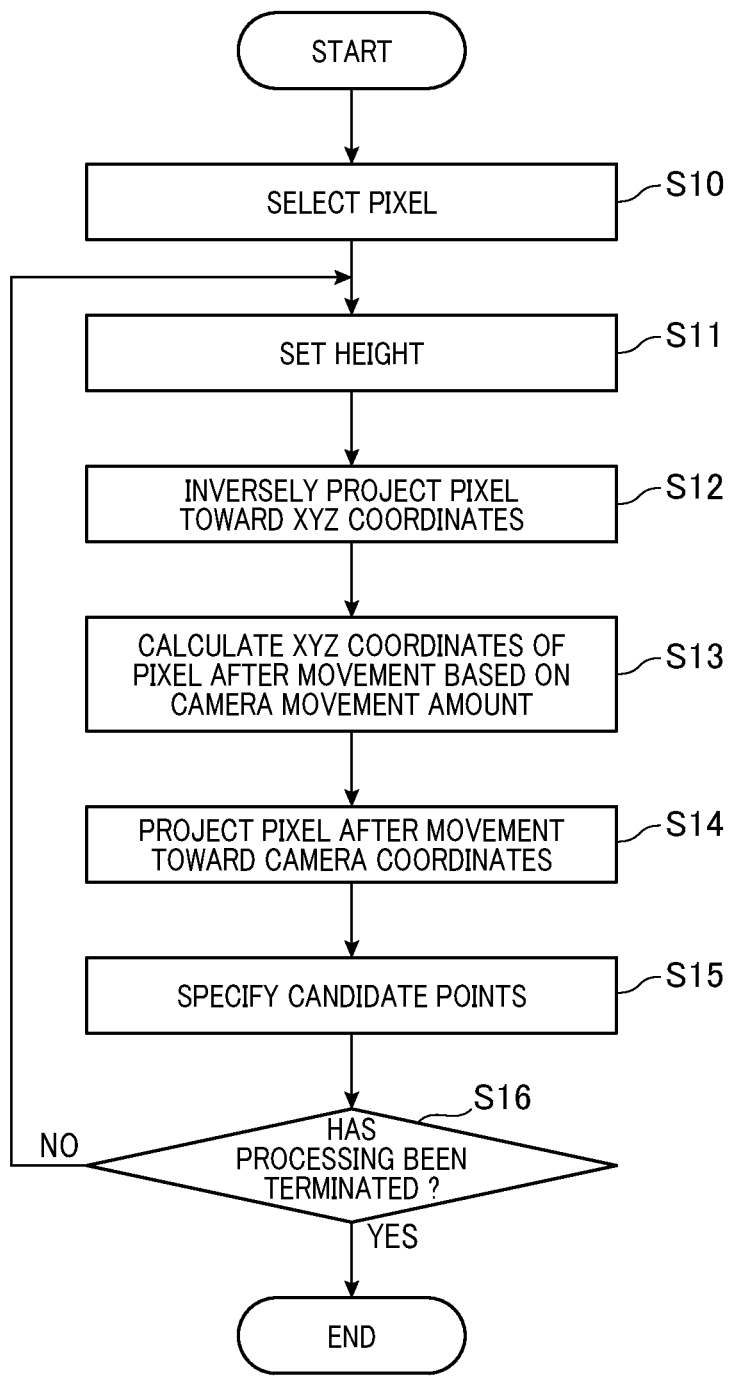
FIG. 5 is a flowchart of a process of calculating candidate points.

FIG. 5 is a flowchart of a process of calculating the candidate points P. The candidate point calculation unit 16 selects pixels of the edge K to be processed for detection of the correspondence point Kp in the image at time $t_1$ (S10). The candidate point calculation unit 16 sets a height h of the edge K as a height candidate value (S11). The candidate point calculation unit 16 inversely projects camera coordinates of the pixel of the edge K to XYZ coordinates (S12). The candidate point calculation unit 16 moves the XYZ coordinates of the pixel of the edge K based on the movement amount of the camera 30, to thereby calculate the XYZ coordinates of the pixel after the movement (S13). The candidate point calculation unit 16 projects the XYZ coordinates of the pixel after the movement to the camera coordinates (S14). As a result, the candidate point calculation unit 16 specifies the corresponding pixel in the image at time $t_1$ as candidate point P (S15). The candidate point calculation unit 16 determines whether to terminate the process (S16). Specifically, the candidate point calculation unit 16 determines whether to calculate the candidate point P based on another height candidate value. As a result, in the case of calculating the candidate point P based on another height candidate value, the candidate point calculation unit 16 decides to continue the process (NO in S16). Then, the candidate point calculation unit 16 returns to the process of setting the height h of the edge K as another height candidate value (S11). On the other hand, in the case of not calculating the candidate point P based on another height candidate value, the candidate point calculation unit 16 terminates this process (YES in S16). When the height h set as a candidate and the position of the camera 30 are not to change over time, the candidate point calculation unit 16 calculates in advance data of the conversion table for each of heights h of the edge K preset as candidates, and stores the same in a predetermined storage area of the memory 3. Accordingly, the object detection device 1 can simplify the coordinate projection process performed by the candidate point calculation unit 16 (steps S12 and S14). As a result, the object detection device 1 can enhance the speed of the process by the candidate point calculation unit 16.

Among a plurality of candidate points $P_n$ in the image at time $t_1$, the correspondence point detection unit 17 detects the candidate point P with maximum correlation with the edge K as correspondence point Kp. The magnitude of the correlation refers to the degree of similarity between the edge K and the candidate point P. In the present embodiment, the magnitude of the correlation is obtained by calculating the sum of absolute values of differences between the pixels at the same position in a predetermined area including the edge K and in a predetermined area including the feature point P, and the calculated value is used as a correlation index value. In the present embodiment, the shape of the predetermined areas is a cross shape.

FIG. 6 is a diagram illustrating a predetermined area $C_0$ including the edge K and a predetermined area $C_1$ including a candidate point $P_{40}$. The correspondence point detection unit 17 calculates the sums of absolute values of differences between the pixels at the same positions in the predetermined areas $C_0$ and $C_1$ in the image at time $t_0$ and the image at time $t_1$. The correspondence point detection unit 17 sets the calculated values as correlation index values. Therefore, a correlation index value is smaller with the larger correlation. The correspondence point detection unit 17 uses the sums of absolute values of differences to determine the magnitudes of the correlation, but the present disclosure is not limited to this. As another determination method, normalized correlation or the like may be used. Among the plurality of candidate points $P_n$, the correspondence point detection unit 17 detects the candidate point P with a smallest correlation index value as the correspondence point Kp. In the example illustrated in FIG. 6, among the plurality of candidate points $P_0$ to $P_{80}$, the correspondence point detection unit 17 detects the candidate point $P_{40}$ with a smallest correlation index value as the correspondence point Kp.

Figure 7:
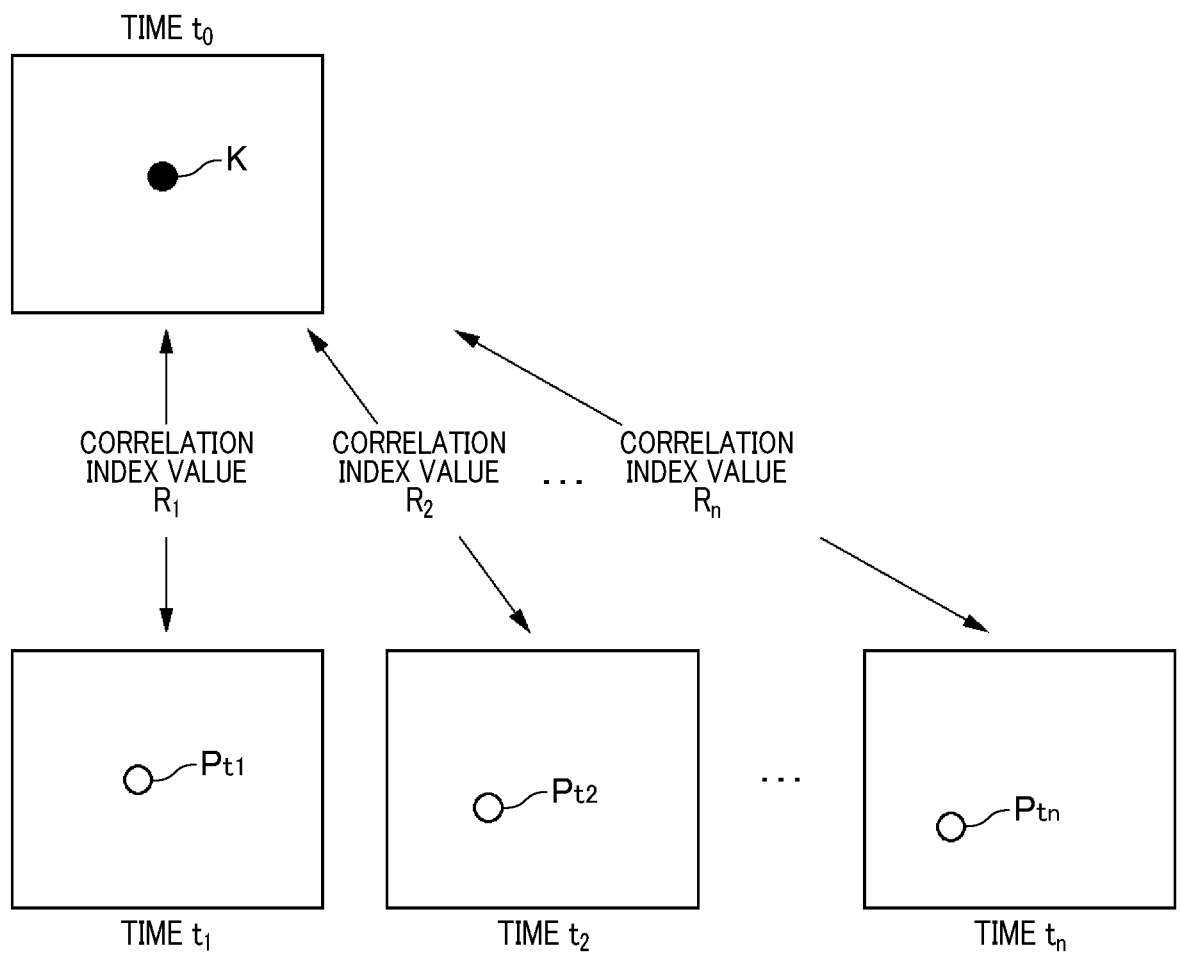
FIG. 7 is a diagram illustrating correlation index values for use in detection of correspondence points.

For ease of understanding, in the foregoing description, the image for use in detection of the correspondence point Kp is set as the image at time $t_1$. FIG. 7 is a diagram illustrating correlation index values R for use in detection of the correspondence point Kp. To enhance the detection accuracy of the correspondence point Kp, in a plurality of images (images at times $t_1$ to $t_n$) captured at time $t_1$ and later as illustrated in FIG. 7, the correspondence point detection unit 17 uses a correlation index value R obtained by averaging a plurality of correlation index values $R_1$, $R_2$, ... $R_n$ between candidate points $P_{t1}$ to $P_{tn}$ and the edge K at the same height h. The method by to use the plurality of correlation index values $R_1$, $R_2$, ... $R_n$ (hereinafter, also collectively called "correlation index values $R_n$") is not limited to averaging. As another method, the correlation index value of the latest image may be more greatly weighted than the correlation index value of the old images, for example. In the present embodiment, the correspondence point detection unit 17 updates the correlation index value R between the edge K and the candidate point P by averaging the plurality of correlation index values $R_n$.

The road surface edge exclusion unit 18 will be described. Among the edges K extracted from the image at time $t_0$, the edge of which the height h from the road surface is zero is an edge on the road surface (hereinafter, called "road surface edge"). Accordingly, the road surface edge exclusion unit 18 detects the edge of which the height h from the road surface is zero and excludes the detected edge from the target of object detection. That is, the road surface edge exclusion unit 18 serves as a road surface feature point detection unit to detect feature points on the road surface. Assuming that the height h of the edge K is zero, the road surface edge exclusion unit 18 specifies the pixel corresponding to the edge K in the image at time $t_1$. As a result, when the magnitude of the correlation between the edge K and the corresponding pixel is greater than a predetermined threshold, the road surface edge exclusion unit 18 determines that the height h from the road surface is zero. For the edge K judged as the road surface edge as described above, the candidate point calculation unit 16 does not calculate the candidate points P based on height candidate values other than zero. That is, the candidate point calculation unit 16 excludes the edge K from the target of the object detection process.

Figure 8:
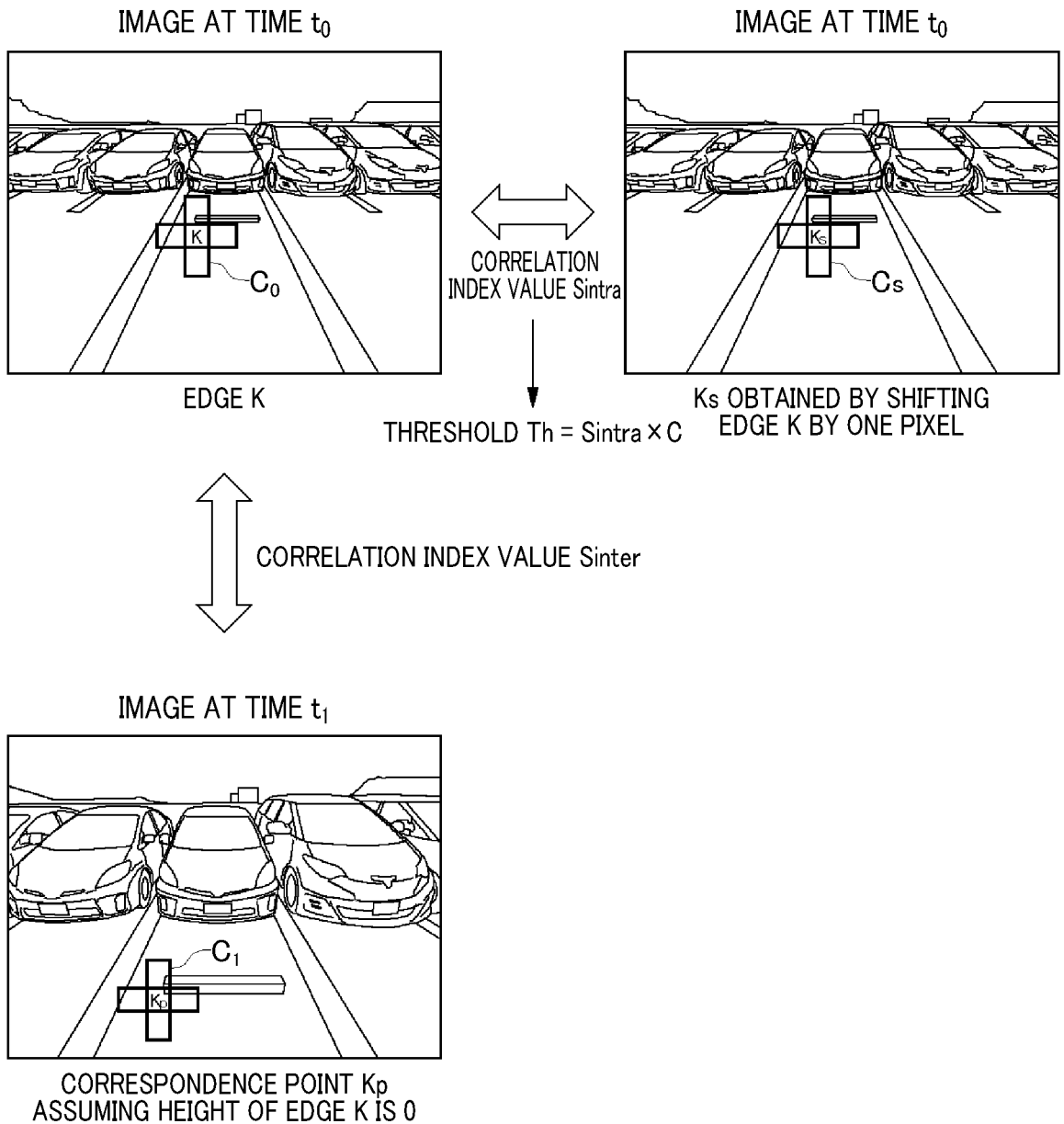
FIG. 8 is a diagram illustrating a process of detecting an edge on a road surface.

Hereinafter, the threshold used by the object detection device 1 in the present embodiment to detect the road surface edge will be described. FIG. 8 is a diagram illustrating a process of detecting the road surface edge. FIG. 8 illustrates an example of determining whether the edge K existing in the image at time $t_0$ is the road surface edge. Assuming that the height h of the edge K is zero, the road surface edge exclusion unit 18 calculates the correspondence point Kp in the image at time $t_1$. Then, the road surface edge exclusion unit 18 calculates a correlation index value Sinter of the edge K and the correspondence point Kp (the sum of absolute values of differences). The road surface edge exclusion unit 18 calculates an edge Ks shifted from the edge K by one pixel in the image at time $t_0$. The number of the pixel to be shifted may be a random value. The road surface edge exclusion unit 18 calculates a correlation index value Sintra between the edge Ks and the edge K. The road surface edge exclusion unit 18 calculates a threshold Th by multiplying the calculated correlation index value Sintra by a constant C.

The road surface edge exclusion unit 18 compares the correlation index value Sinter with the threshold Th (=Sintra×C). As a result, when the correlation index value Sinter is equal to or smaller than the threshold Th, the road surface edge exclusion unit 18 determines that the edge K is the road surface edge. That is, when the magnitude of correlation between the edge K and the correspondence point Kp is greater than a predetermined magnitude, the road surface edge exclusion unit 18 determines that the edge K is the road surface edge. Then, the road surface edge exclusion unit 18 excludes the edge K from the target of the object detection process. The edge K can be excluded by the foregoing determination because the larger correlation between the edge K and the correspondence point Kp than the correlation between the edge K and the edge Ks shifted by one pixel (or a random value) means that the assumption of the height h being zero is true. For the edge K judged as the road surface edge, the candidate point calculation unit 16 does not perform the process of assuming a plurality of heights and calculating the candidate points P. With the road surface edge exclusion unit 18, the object detection device 1 can reduce a load of arithmetic processing related to object detection. That is, the object detection device 1 enhances the speed of the object detection process.

The height calculation unit 19 calculates the height h of the correspondence point Kp detected by the correspondence point detection unit 17. In other words, based on the correlation index values R, the height calculation unit 19 specifies the height h of the candidate point P with the maximum correlation with the edge K among the candidate points P of the edges $K_n$ in the image at time $t_1$. The height calculation unit 19 calculates the height h of the correspondence point Kp by setting the specified height h as the height h of the correspondence point Kp. The height h of the correspondence point Kp is the height of the object. Accordingly, when the height h calculated by the height calculation unit 19 is not zero, the object detection device 1 performs object detection. Specifically, the object detection device 1 performs object detection assuming that the edge K of which the correspondence point Kp with the height h other than zero indicates part of an object.

(Operations of the Object Detection Device)

Figure 9:
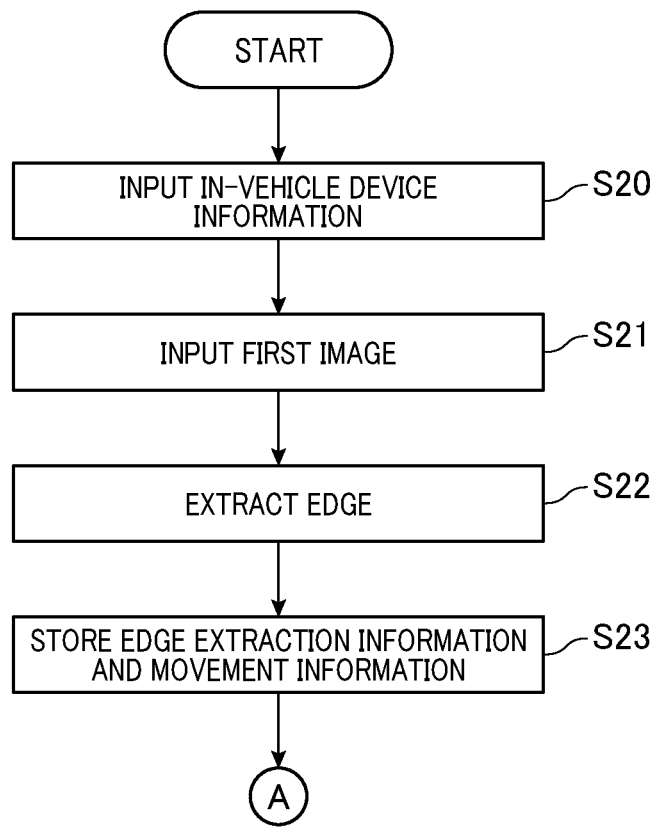
FIG. 9 is a flowchart of a process of detecting an object by an object detection device.
Figure 10:
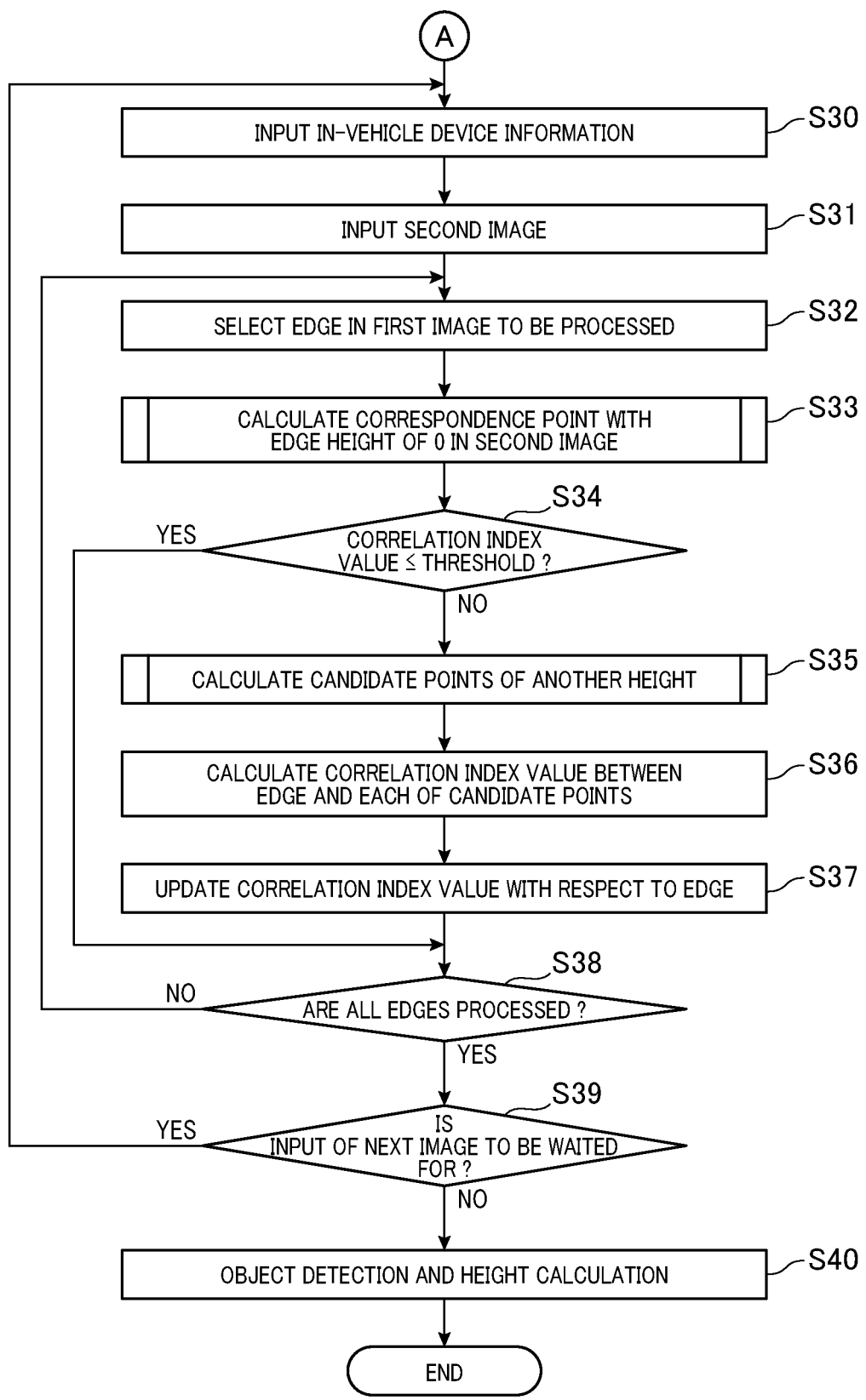
FIG. 10 is a flowchart of the process of detecting an object by the object detection device.

FIGS. 9 and 10 are flowcharts illustrating a process of detecting an object by the object detection device 1. The object detection device 1 receives and inputs in-vehicle device information relating to movement via the in-vehicle LAN 31 (S20). The object detection device 1 receives and inputs an image from the camera 30 (S21). The input image here will be called "first image". The object detection device 1 extracts edges $K_n$ (feature points) from the input first image (S22). The object detection device 1 stores extracted information of the edge K (coordinate values in the image) and vehicle movement information (for example, the steering angle and the average of the wheel driving amount included in the in-vehicle device information) in association with each other in the memory 3 (S23). In other words, the object detection device 1 stores the extracted information of the edge K and the movement information of the camera 30 mounted in the vehicle in association with each other in the memory 3.

The object detection device 1 receives and inputs again the in-vehicle device information relating to movement via the in-vehicle LAN 31 (S30). The object detection device 1 receives and inputs an image from the camera 30 (S31). The image received here will be called "second image". The object detection device 1 selects the edge $K_n$ to be processed for detecting the correspondence point Kp from among the edges Kr, extracted from the first image (S32). The object detection device 1 calculates the correspondence point Kp in the second image on the assumption that the height h of the selected edge K is zero (S33). The object detection device 1 calculates the correspondence point Kp using the movement information of the camera 30 from time $t_0$ to time $t_1$ (S33).

The object detection device 1 calculates the correlation index value Sinter between the edge K and the correspondence point Kp and the threshold Th, and determines whether the correlation index value Sinter is equal to or smaller than the threshold Th (S34). In this case, the correlation index value Sinter and the threshold Th described above with reference to FIG. 8 are used. When determining that the correlation index value Sinter is equal to or smaller than the threshold Th (YES in S34), the object detection device 1 considers the edge K as the road surface edge and excludes the edge K from the target of the object detection process. That is, when the correlation between the edge K and the correspondence point Kp is greater than a predetermined magnitude, the object detection device 1 determines that the edge K is the road surface edge and excludes the edge K from the target of the object detection process. In this case, the edge K is excluded from the target of the object detection process by skipping steps S35 to S37 and proceeding to step S38.

When determining that the correlation index value Sinter is greater than the threshold Th (NO in step S34), the object detection device 1 does not determine that the edge K is the road surface edge. Then, based on the height candidate values of the edge K other than zero, the object detection device 1 calculates the candidate points $P_n$ corresponding to the height candidate values in the second image (S35). The object detection device 1 calculates the plurality of correlation index values $R_n$ between the edge K and the candidate points $P_n$ (S36).

The object detection device 1 updates the correlation index value R with respect to the edge K (S37). In this process, the plurality of correlation index values $R_n$ between the candidate points $P_n$ and the edge K at the same height in the plurality of second images is averaged. Specifically, when the correlation index value R is calculated in a new second image, the object detection device 1 updates the correlation index value R using the average of the plurality of correlation index values $R_n$ calculated based on the plurality of second images having been obtained so far. For example, the images at time $t_1$, time $t_2$, ... time $t_m$ have been already input and processed. Further, the correlation index values R between the edge K and the candidate points P have been calculated from the equation $[R=(R_1+R_2+R_m)/m]$ using the correlation index values $R_1, R_2, \ldots R_m$ calculated based on the individual images. Then, the calculation results (the magnitudes of the correlations) are stored in the memory 3. In this state, a new image is received and a correlation index value $R_{m+1}$ is calculated. The object detection device 1 calculates a correlation index value in the $R_{new}$ image as described below. The object detection device 1 calculates the new correlation index value $R_{new}$ using a correlation index value $R_{old}$ stored in the memory 3 from the equation $[R_{new}=(R_{m+1}+m \times R_{old})/(m+1)]$. The object detection device 1 stores the calculation result (the magnitude of the correlation) in the memory 3. In this manner, the object detection device 1 successively updates the correlation index value R (the magnitude of the correlation). Accordingly, after calculating and storing the new magnitude of the correlation, the object detection device 1 can delete the input images from the predetermined storage area. Thus, the object detection device 1 can reduce the storage capacity required for use in the arithmetic process relating to object detection.

The object detection device 1 determines whether all the edges $K_n$ extracted from the first image have been processed (S38). As a result, when not determining that all the edges $K_n$ have been processed (NO in S38), the object detection device 1 selects the next edge K to be processed (S32). On the other hand, when determining that all the edges $K_n$ have been processed (YES in S38), the object detection device 1 determines whether to wait for a reception of the next image (S39). In other words, the object detection device 1 determines whether there is a need to wait for a reception of the next image from the camera 30 for object detection. When determining to wait for a reception of the next image (YES in S39), the object detection device 1 returns to step S30 in the input process of the in-vehicle device information. On the other hand, when determining that there is no need to wait for a reception of the next image (NO in S39), the object detection device 1 performs object detection and calculates the height h of the object based on the correlation index values R of the candidate points P of the individual edges $K_n$ (S40). Specifically, among the correlation index values R of the candidate points P of the individual edges $K_n$ in the image, the object detection device 1 detects the candidate point P with the smallest correlation index value R as the correspondence point Kp of the edge K. When the correlation index value R of the candidate point P is equal to or smaller than the predetermined threshold, the object detection device 1 detects the object at the position of the edge K. In addition, the object detection device 1 sets the height h of the detected correspondence point Kp as the height of the object. In other words, when the correlation of the candidate point P with the maximum correlation is equal to or greater than a predetermined magnitude, the object detection device 1 detects the object at the position of the edge K. Then, the object detection device 1 sets the height h of the correspondence point Kp detected by the candidate point P as the height of the object.

The object detection device 1 and the object detection method in the present embodiment have been described so far. At the detection of the correspondence point Kp of the edge K, the object detection device 1 in the present embodiment sets a plurality of heights as height candidates of the edge K. Then, the object detection device 1 calculates the plurality of correlation index values $R_n$ between the candidate points $P_n$ corresponding to the plurality of heights set as candidates and the edge K. The object detection device 1 specifies the candidate point P based on the calculated correlation index values $R_n$ and sets the specified candidate point P as the correspondence point Kp. In this manner, the object detection device 1 detects the correspondence point Kp of the edge K. Accordingly, the object detection device 1 in the present embodiment needs to calculate the correlation index values R for use in detection of the correspondence point Kp of the edge K only for the candidate points $P_n$ at the individual heights set as candidates, with a small amount of arithmetic operation. Therefore, the object detection device 1 can reduce a load of arithmetic processing related to object detection. In other words, the object detection device 1 in the present embodiment can detect the correspondence point Kp of the edge K from among the candidate points $P_n$. As a result, the object detection device can reduce a load of arithmetic processing related to object detection.

The object detection device 1 in the present embodiment has been described so far. However, the object detection device of the present disclosure is not limited to the embodiment described above. In the embodiment described above, the number and values of candidates set as height candidates of the edge K are predetermined. In another configuration, the number and values of the candidates may be changed depending on movement modes of the vehicle such as movement speed, acceleration, and steering angle, and surrounding environments of the vehicle such as weather, time (for example, different time periods such as daytime and nighttime), and road type. In this case, for example, when the speed of the vehicle is high, the number of height candidates to be set is increased to subdivide the candidate points P. This makes it possible to properly detect the correspondence point Kp of the edge K even while the vehicle is moving at a high speed. In reverse, when the speed of the vehicle is slow, the number of height candidates to be set may be decreased to enhance the speed of the object detection process.

The detection result of the object detection process of the present disclosure may be used in another application. The result of the object detection can be used in a pre-crush safety system (PCS), for example. In this case, when determining that there is a high probability of a collision between the detected object and the vehicle based on the detection result from the object detection device, the system performs a notification for warning and a control of braking force. This assists the driver in a collision avoidance operation. In addition, the result of the object detection can be used in a traffic sign recognition (TSR) system. In this case, based on the detection result from the object detection system, the system recognizes a traffic sign from the detected object. This supports safe running of the vehicle. Further, the result of object detection can be used in a lane keep assist (LKA) system. Based on the detection result from the object detection device, the system detects an edge of the road on which the vehicle is running from an object such as guard rail, for example. Then, based on the road edge and the vehicle position, the system performs a notification for warning and a control of steering. This supports safe running of the vehicle.

The technique of the present disclosure is useful as a technique for detecting an object from images captured by a camera mounted in a moving body such as a vehicle.

What is claimed is:

1. An object detection device comprising:
    an image input unit that acquires images captured by a camera mounted in a moving body;
    a movement information acquisition unit that acquires movement information of the moving body based on information received from a device mounted in the moving body;
    a feature point extraction unit that extracts a feature point from a first image acquired by the image input unit;
    a candidate point calculation unit that, based on the movement information,
        calculates a plurality of candidate points corresponding to the feature point in a second image captured at a time different from the first image,
        sets a plurality of predetermined heights as height candidates of the feature point in accordance with heights, and
        calculates the plurality of candidate points corresponding to the plurality of the predetermined heights set as the height candidates of the feature point;
    a correspondence point detection unit that calculates a magnitude of correlation between the feature point and each of the plurality of candidate points, and detects from the candidate points a correspondence point corresponding to the feature point based on the magnitude of the correlation; and
    an object detection unit that detects an object at a position of the feature point when a height of the correspondence point is larger than a predetermined value.

2. The object detection device according to claim 1, wherein the correspondence point detection unit detects, from among the plurality of candidate points, the candidate point with maximum correlation, as the correspondence point.

3. The object detection device according to claim 1, comprising a height calculation unit that calculates a height of the correspondence point as a height of an object.

4. The object detection device according to claim 1, wherein the candidate point calculation unit calculates the plurality of candidate points while changing the height of the feature point and the number of the height candidates depending on a mode of movement of the moving body or a surrounding environment of the moving body.

5. The object detection device according to claim 1, wherein the feature point extraction unit scans the first image to search for the feature point, and when detecting the feature point, the feature point extraction unit omits a search of a predetermined pixel range including the detected feature point.

6. The object detection device according to claim 5, wherein the feature point extraction unit scans every other pixel of the first image to search for the feature point.

7. The object detection device according to claim 1, wherein the candidate point calculation unit calculates the candidate point assuming that the height of the feature point is zero, and when the magnitude of the correlation between the feature point and the candidate point is equal to or greater than a predetermined magnitude, the candidate point calculation unit excludes the feature point from a target of object detection processing.

8. The object detection device according to claim 1, comprising a road surface feature point detection unit that detects a feature point on a road surface, wherein
    the road surface feature point detection unit calculates the candidate point assuming that the height of the feature point is zero, and when the magnitude of the correlation between the feature point and the candidate point is equal to or greater than a predetermined magnitude, the road surface feature point detection unit detects the feature point as the feature point on the road surface.

9. The object detection device according to claim 1, wherein
    the image input unit acquires the first image captured along with movement of the moving body and a plurality of second images captured following the first image,
    when the initial second image is acquired following the first image, the correspondence point detection unit calculates a magnitude of correlation between a feature point in the first image and each of a plurality of candidate points in the second image and stores the calculated magnitude of the correlation in a predetermined storage area, and
    when the new second image is acquired, the correspondence point detection unit repeats the following processes (i) to (iii) along with the reception of the new second image, (i) calculating a magnitude of correlation between the feature point in the first image and each of a plurality of candidate points in the new second image, (ii) calculating a new magnitude of correlation based on the calculated magnitude of the correlation and the stored magnitude of the correlation, and (iii) storing the calculated new magnitude of the correlation in a predetermined storage area.

10. An object detection method used by an object detection device to detect an object, comprising the steps of:
    by the object detection device, acquiring images captured by a camera mounted in a moving body;
    by the object detection device, acquiring movement information of the moving body based on information received from a device mounted in the moving body;
    by the object detection device, extracting a feature point from a first image acquired from the camera; and
    by the object detection device, based on the movement information, calculating a plurality of candidate points corresponding to the feature point in a second image captured at a time different from the first image, sets a plurality of predetermined heights as height candidates of the feature point in accordance with heights, and calculating the plurality of candidate points corresponding to the plurality of the predetermined heights set as the height candidates of the feature point;

by the object detection device, calculating a magnitude of correlation between the feature point and each of the plurality of candidate points, and detecting from the candidate points a correspondence point corresponding to the feature point based on the magnitude of the correlation; and by the object detection device, detecting an object at the position of the feature point when a height of the correspondence point is greater than a predetermined threshold.

11. A non-transitory tangible recording medium storing a program for causing a computer to execute the steps of:

acquiring images captured by a camera mounted in a moving body;

acquiring movement information of the moving body based on information received from a device mounted in the moving body;

extracting a feature point from a first image acquired from the camera; and based on the movement information, calculating a plurality of candidate points corresponding to the feature point in a second image captured at a time different from the first image, setting a plurality of predetermined heights as height candidates of the feature point in accordance with heights, and calculating the plurality of candidate points corresponding to the plurality of the predetermined heights set as the height candidates of the feature point;

calculating a magnitude of correlation between the feature point and each of the plurality of candidate points, and detecting from the candidate points a correspondence point corresponding to the feature point based on the magnitude of the correlation; and detecting an object at the position of the feature point when a height of the correspondence point is greater than a predetermined threshold.

12. An object detection device comprising:

an image input unit that acquires images captured by a camera mounted in a moving body;

a movement information acquisition unit that acquires movement information of the moving body based on information received from a device mounted in the moving body;

a feature point extraction unit that extracts a feature point from a first image acquired by the image input unit;

a candidate point calculation unit that, based on the movement information, calculates a plurality of candidate points corresponding to the feature point in a second image captured at a time different from the first image and calculates the plurality of candidate points corresponding to a plurality of heights set as height candidates of the feature point in accordance with the heights;

a correspondence point detection unit that calculates a magnitude of correlation between the feature point and each of the plurality of candidate points, and detects from the candidate points a correspondence point corresponding to the feature point based on the magnitude of the correlation; and an object detection unit that detects an object at a position of the feature point when a height of the correspondence point is larger than a predetermined value, wherein the image input unit acquires the first image captured along with movement of the moving body and a plurality of second images captured following the first image, when the initial second image is acquired following the first image, the correspondence point detection unit calculates a magnitude of correlation between a feature point in the first image and each of a plurality of candidate points in the second image and stores the calculated magnitude of the correlation in a predetermined storage area, and when the new second image is acquired, the correspondence point detection unit repeats the following processes (i) to (iii) along with the reception of the new second image, (i) calculating a magnitude of correlation between the feature point in the first image and each of a plurality of candidate points in the new second image, (ii) calculating a new magnitude of correlation based on the calculated magnitude of the correlation and the stored magnitude of the correlation, and (iii) storing the calculated new magnitude of the correlation in a predetermined storage area.

* * * * *